(12) United States Patent
Degrace et al.

(10) Patent No.: US 12,470,455 B2
(45) Date of Patent: Nov. 11, 2025

(54) EFFICIENT STATE REPLICATION IN SDN NETWORKS

(71) Applicant: MICROSOFT TECHNOLOGY LICENSING, LLC, Redmond, WA (US)

(72) Inventors: Gerald Roy Degrace, Atlanta, GA (US); Deepak Bansal, Bellevue, WA (US); Rishabh Tewari, Sammamish, WA (US); Michal Czeslaw Zygmunt, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 521 days.

(21) Appl. No.: 17/958,346

(22) Filed: Oct. 1, 2022

(65) Prior Publication Data

US 2023/0370326 A1 Nov. 16, 2023

Related U.S. Application Data

(60) Provisional application No. 63/342,058, filed on May 13, 2022.

(51) Int. Cl.
*H04L 12/00* (2006.01)
*H04L 41/0654* (2022.01)

(52) U.S. Cl.
CPC .................. *H04L 41/0654* (2013.01)

(58) Field of Classification Search
CPC ............ H04L 41/0654; H04L 41/0663; H04L 41/0895; H04L 41/40

USPC .................. 709/227, 228; 370/225
See application file for complete search history.

(56) References Cited

U.S. PATENT DOCUMENTS

| | | | |
|---|---|---|---|
| 7,860,985 B2 * | 12/2010 | Wang | H04L 69/16 709/227 |
| 11,652,749 B2 | 5/2023 | Degrace et al. | |
| 2005/0278459 A1 * | 12/2005 | Boucher | H04L 47/193 709/250 |
| 2008/0294784 A1 * | 11/2008 | Wang | H04L 69/163 709/228 |

OTHER PUBLICATIONS

"Application as Filed in U.S. Appl. No. 17/855,730", Filed date: Jun. 30, 2022, 46 Pages.
"International Search Report and Written Opinion Issued in PCT Application No. PCT/US23/015605", Mailed Date: Jun. 7, 2023, 13 Pages.

* cited by examiner

*Primary Examiner* — Frantz Coby
(74) *Attorney, Agent, or Firm* — Han Gim; Newport IP, LLC

(57) ABSTRACT

Transmission Control Protocol (TCP) states of an active device are replicated at a backup device configured to track connections in a software defined network (SDN). The backup device receives, from the active device, a TCP packet with a TCP flag including one or more of SYN, SYN-ACK, ACK, FIN, FIN-ACK, ACK, or RESET. When the TCP packet has a SYN flag, the backup device adds a connection record to a connection table. Otherwise, the backup device derives an updated connection state for the connection record using a TCP state machine. The connection state is updated as future packets are received by the backup device.

15 Claims, 12 Drawing Sheets

EFFICIENT STATE REPLICATION IN SDN NETWORKS

PRIORITY APPLICATION

This application claims the benefit of and priority to U.S. Provisional Application No. 63/342,058, filed May 13, 2022, the entire contents of which are incorporated herein by reference.

BACKGROUND

A data center may house computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

Disclosed herein are systems and methods for communicating connection state from a primary device or machine to a backup device or machine to allow the backup device or machine to become the new primary in the event of failure of the current primary, or for other operational reasons. In an example, the connection state can be for a TCP connection. The devices or machines are configured to perform policy enforcement, packet transformations, and packet forwarding in a communications network. The primary and backup devices or machines preserve the connection state in the event of fail-over in order to prevent the connections that are currently being processed from having to reset and re-establish after the fail-over. As the devices or machines can be processing up to tens of millions of connections per second, synchronizing connection state must be very efficient. For example, a single connection processing engine handling 5 million connections per second could result in 10s of millions of connection synchronization messages if optimizations are not implemented.

Should the primary device or machine no longer be able to process TCP flows for any reason, the primary and backup devices or machines can be switched via network routing updates to the backup device or machine for processing. The backup device or machine creates and maintains identical connection records within a fast path connection table along with the current TCP state and all other information necessary for processing the connections using procedures disclosed herein.

One methodology for connection tracking is to simply send the opening and closing sequence of packets to characterize the different connection state points of interest. However, there are negative consequences of such a data intensive mechanism. Nevertheless, this is the state of the art today in many implementations, which results in high overhead that reduce the total throughput of the connection processing engine devices. The present disclosure provides a more efficient methodology as compared sending, for example, SYN/SYN-ACK, ACK and FIN/FIN-ACK, ACK to the secondary device. By sending the SYN/SYN-ACK, ACK and FIN/FIN-ACK, ACK to the secondary device, the resulting synchronization can consume at least 4-6 packets for every single connection just for setup and teardown.

The present disclosure provides techniques to allow for efficiency improvements in communicating connection state across two such devices, creating a highly available connection state backup. The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments enable datacenters to provide services in a manner that can reduce the cost and complexity of their networks, allowing for more efficient use of computing, storage, and network resources. Efficient implementation of the end-to-end service by a cloud service provider can enable an experience that is seamless and more consistent across various footprints. The integration of multi-tenant and single-tenant resources with a comprehensive resource management approach can also minimize the overhead for the user, who will not need to address policy enforcement issues and perform other complex management tasks. The efficient implementation of the described synchronization functions can provide improvements for various performance and security metrics such as latency and data security.

Figure 1:
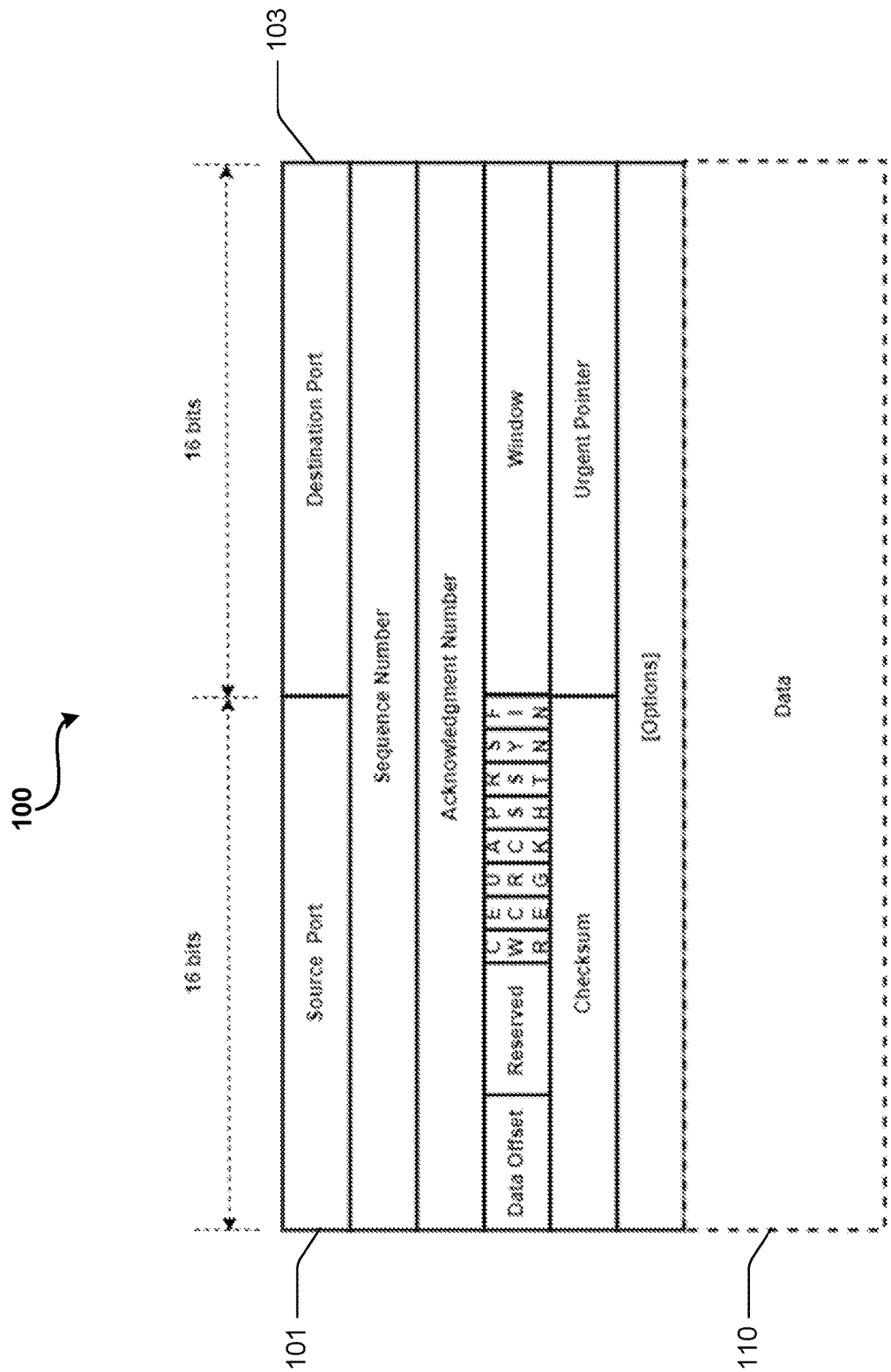
FIG. 1 is a diagram illustrating an example header in accordance with the present disclosure.
Figure 2:
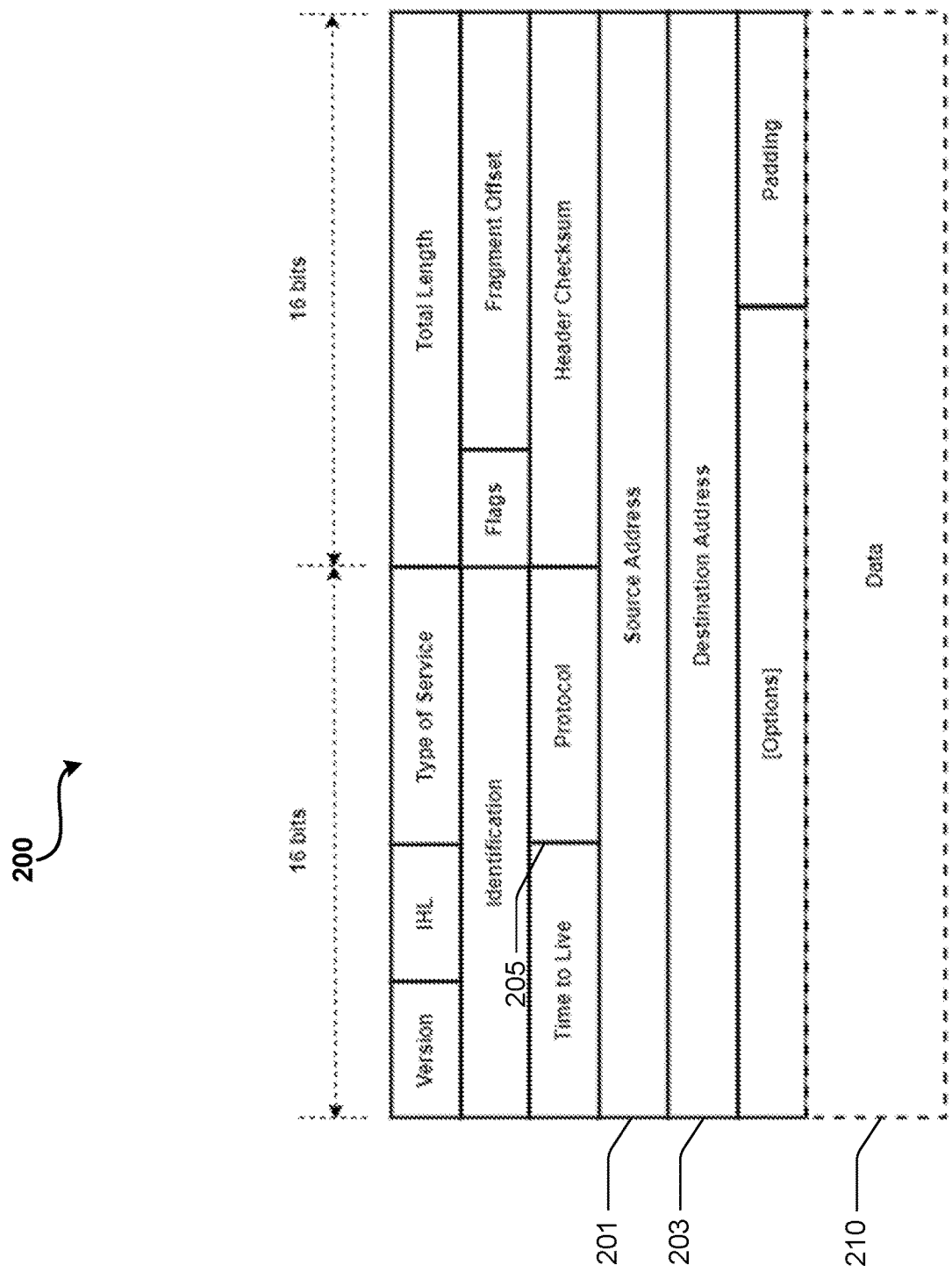
FIG. 2 is a diagram illustrating an example header in accordance with the present disclosure.

With reference to FIG. 1, illustrated is an example a TCP Header Definition 100. The TCP Header Definition 100 includes a source port field 101, destination port field 103, and data or payload 110. With reference to FIG. 2, illustrated is an example IP Header Definition 200. In an embodiment, a reference may be made to a 5-tuple match which includes the IP frame source 201, destination 203. and protocol type 205. The TCP header 100 adds the source port 103 and destination port 105. These five fields make up a unique key that uniquely identifies one connection from another. Fast path operations of connection processing engines are based on building a connection table with 5-tuple as the key, that in turn points to a group of related mappings that describe how to transform a packet and/or add tunnels, identify the outgoing interface(s) and so forth. The connection table itself is created on a per virtual interface basis. This could be an interface of a VM, for example. Connection processing engines typically perform the connection processing for many virtual interfaces. Connection tracking equates to bandwidth that cannot be used for user traffic and hence any reduction or compression of messages for synchronizing connection states will increase the available throughput for user traffic.

In an example, assume that the simplest way to convey connection state to another device or machine would be for the primary device or machine to communicate related packets for the TCP connection state to the secondary device or machine. This would include any packet with TCP flags set such as (SYN, SYN-ACK, ACK, FIN, FIN-ACK, ACK, RESET). These particular packet types (indicated by TCP flags) allow an identical and standardized TCP state machine to derive the connection state.

The methods for creating a "fast path connection record" when a SYN packet arrives can be similar to what is commonly referred to as "slow path" as described in Disaggregated APIs for SONiC Hosts (DASH) open-source documentation found within the Github. Connection flows can be re-simulated using the techniques described in application Ser. No. 17/855,730 "RE-SIMULATION OF UPDATED SDN CONNECTION FLOWS" filed Jun. 30, 2022, the contents of which are incorporated herein by reference.

Figure 3:
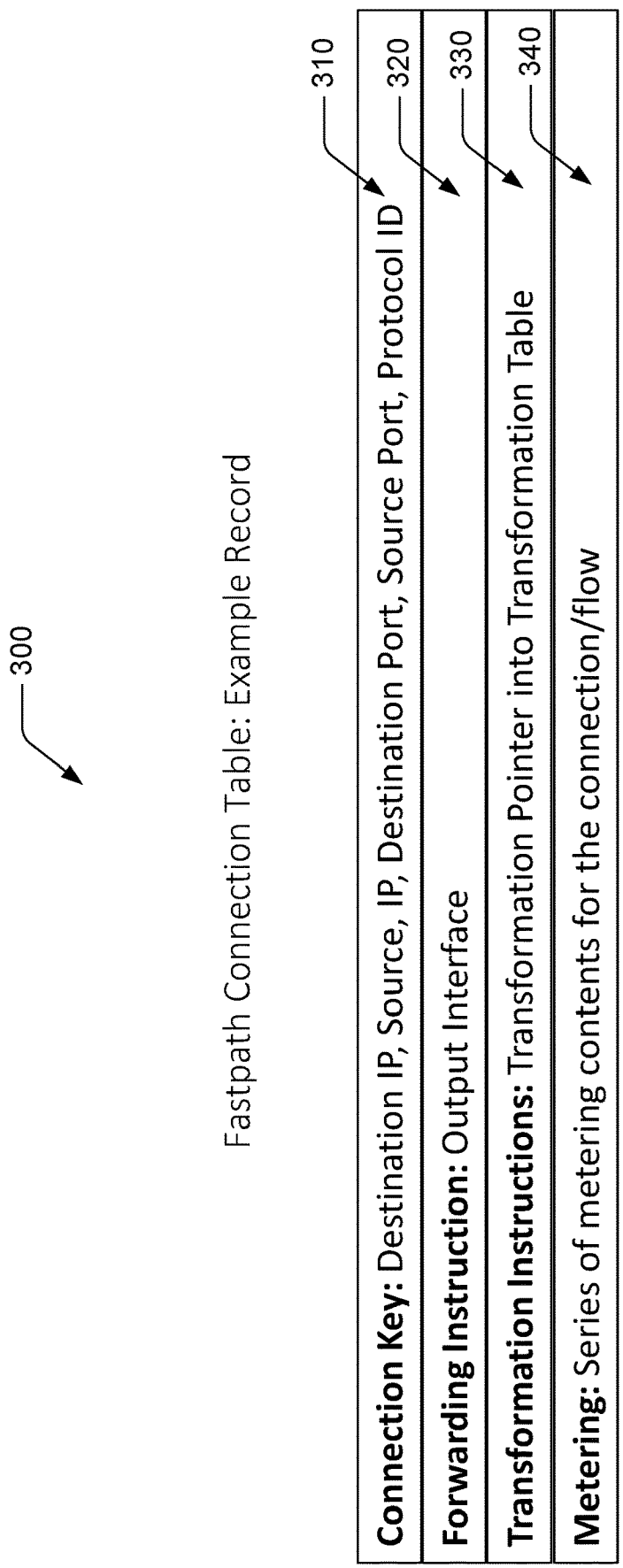
FIG. 3 is a diagram illustrating an example connection record in accordance with the present disclosure.

FIG. 3 illustrates an example record of a fast path connection table 300. Connection table 300 illustrates an entry for a connection key 310 that includes a Destination IP, Source IP, Destination Port, Source Port, and Protocol ID. Forwarding Instruction 320 may include, for example, an Output Interface that may indicate where the packet needs to go, such as identify an interface at a network interface card (NIC). Transformation Instructions 330 may include a Transformation Pointer into the Transformation Table. The instructions may indicate the transformations identified for packets in the flow such as applying a tunnel on it, changes of source or destination addresses, new filters, etc. Metering 340 may include a series of metering contents for the connection/flow. Metering may allow for charging based on usage, for example.

The Connection Key 310 may be a constant for the duration of the record. The Forwarding Instruction 320 output interface can be updated by the SDN control plane via re-simulation. Transformation Instructions 330 can be updated by the SDN control plane via-re-simulation. Metering 340 may be valid while the record is constant or aggregated and sent upwards if the record is changed.

Figure 4:
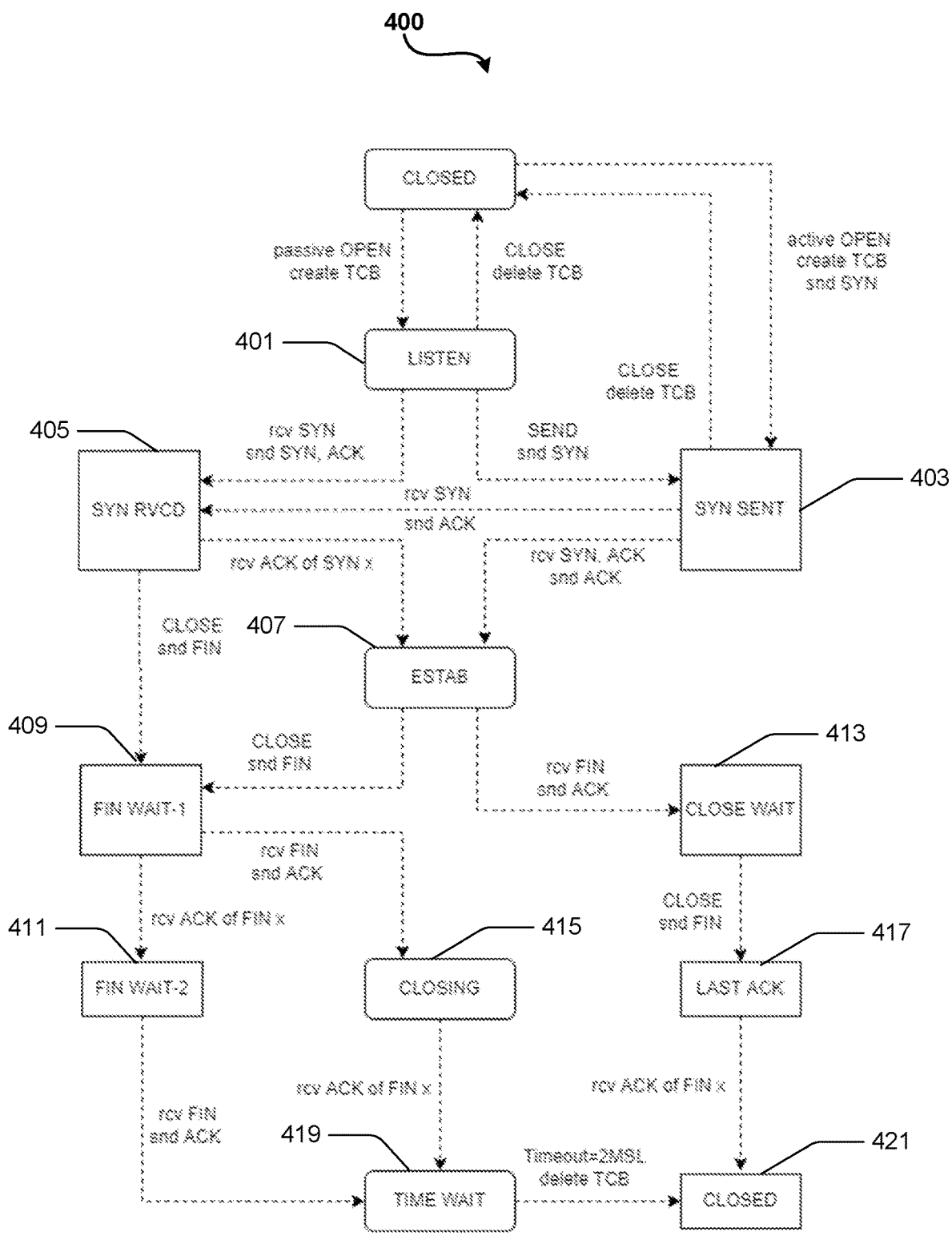
FIG. 4 is a diagram illustrating an example state diagram in accordance with the present disclosure.

With reference to FIG. 4, illustrated is an example TCP State Machine 400. In various embodiments, the open and closing of connections are considered. The full state machine is used to manage every TCP connection by the connection processing engine. For messaging, the open and close of connections of interest is tracked by entering established state (or open) and the entering close/listening state (or closing). By tracking these two points in the state machine, as further discussed below, the timing of a connection open or close can be keyed to the secondary or backup device. In an example, the states include LISTEN 401 which represents waiting for a connection request from any remote TCP and port, SYN-SENT 403 which represents waiting for a matching connection request after having sent a connection request, SYN RVCD 405 which represents waiting for a confirming connection request acknowledgment after having both received and sent a connection request, ESTABLISHED 407 which represents an open connection where data received can be delivered to the user and is the normal state for the data transfer phase of the connection. FIN-WAIT-1 409 which represents waiting for a connection termination request from the remote TCP, or an acknowledgment of the connection termination request previously sent, FIN-WAIT-2 411 which represents waiting for a connection termination request from the remote TCP, CLOSE-WAIT 413 which represents waiting for a connection termination request from the local user, CLOSING 415 which represents waiting for a connection termination request acknowledgment from the remote, LAST-ACK 417 which represents waiting for an acknowledgment of the connection termination request previously sent to the remote TCP, TIME-WAIT 419 which represents waiting for enough time to pass to be sure the remote TCP received the acknowledgment of its connection termination request, and CLOSED 421 which represents no connection state.

Figure 5:
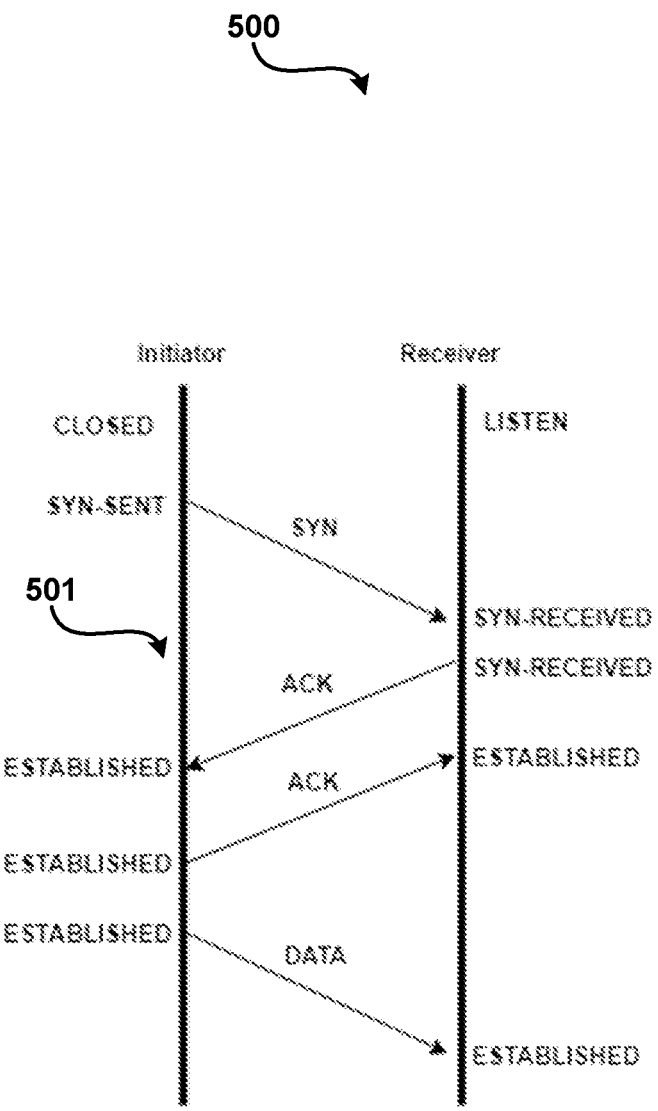
FIG. 5 is a diagram illustrating an example flow diagram in accordance with the present disclosure.
Figure 6:
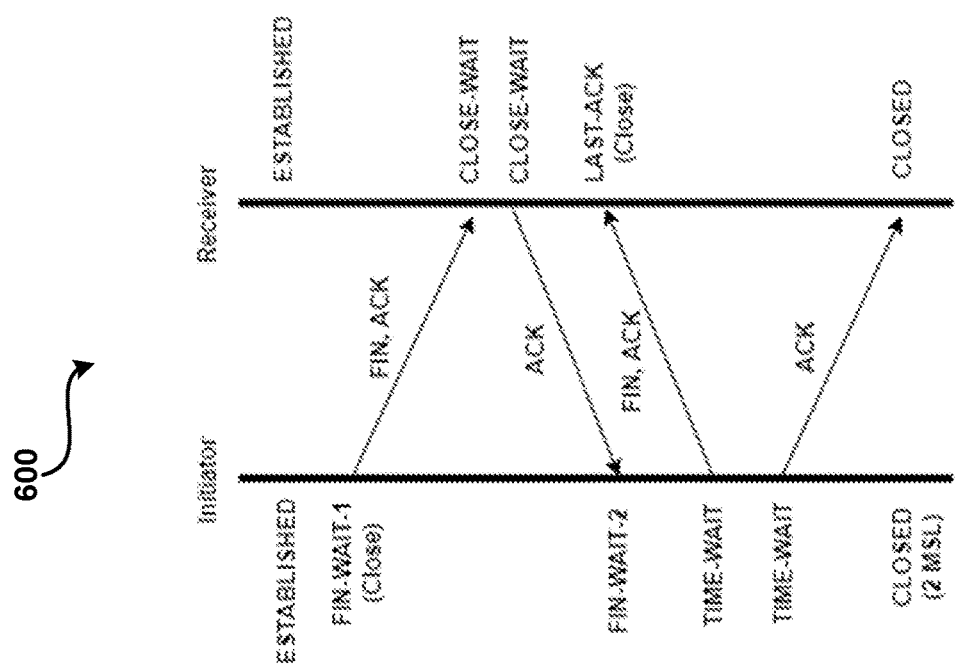
FIG. 6 is a diagram illustrating an example flow diagram in accordance with the present disclosure.

With reference to FIG. 5, illustrated is an example of an Open and Closing Sequence 500 of a TCP Connection. For SYN/ACT 501, the present disclosure provides a way to efficiently message open actions to the secondary or backup device, or without the need to send more than a single message per connection. With reference to FIG. 6, illustrated is an example of a Closing Sequence 600 of a TCP Connection. The present disclosure provides a way to efficiently message close actions to the secondary or backup device, or without the need to send more than a single message per connection.

In an embodiment, connection tables may be formed and referenced through a 5-tuple key per virtual interface. The content of the connection table points to a mapping table that can be used to translate, encapsulate, and forward packets. Each connection in the connection table has a reference to a specific mapping table entry as all connections in the connection table are unique.

The following describes an embodiment of an Efficient Connection Tracking Mechanism:

After creation of the connection record, future packets received by the secondary or backup device are used to update the TCP connection state found within the record or alternatively remove the record upon receiving the full FIN, FIN-ACK, ACK sequence in both directions. Methods for aging out stale TCP connections can also be used.

In an embodiment, the fast path record can be located using the TCP tuple key consisting of (SRC IP, DST IP, SRC Port, DST Port, Port ID). The connection record includes the TCP tuple key, the currently derived TCP state, as well as forwarding and transformation information used by fast path processing and other possible meta-data. As used herein, the slow path refers to a full packet processing path, and the fast path refers to a connection being offloaded to processing on an acceleration device once a connection is evaluated (e.g., via the slow path).

The information within the connection record is sufficient to allow packets of a specific TCP flow to be processed, transformed and/or forwarded/blocked by the secondary device or machine should it become the primary or active forwarding device or machine at some point in the future.

As connection-related packets arrive at the secondary or backup machine, the connection record's TCP state is updated in the same manner as the primary machine.

If the secondary or backup machine is required to process the TCP flows at any time in the future, it has an identical connection record in the fast path connection table as the primary secondary or backup, and can process packets as if it were the primary secondary or backup and account for the latest connection state and procedures.

Otherwise, the secondary machine's role is to create/delete connection records and maintain TCP state as the TCP flows will be normally processed at the primary machine in the steady state.

By refraining from sending every SYN/SYN-ACK, ACK, FIN/FIN-ACK, ACK while simultaneously grouping several connections from the lists, the number of packets per second that have to travel between devices can be substantially reduced. For example, if 10 connection opens are grouped in a single update, the number of packets may be reduced by 20-30 times. If 10 close actions in a single update are grouped, the number of packets may be reduced by 20-30 times. In one embodiment, opens and closes may be sent in a single update so that the efficiency can be further increased.

In an embodiment, another mechanism is described for efficient TCP state replication from primary to secondary device or machine:

In an example, assume a connections tuple (SRC IP, DST IP, SRC Port, DST Port, Port ID) is used as the key to create/locate a connections record and its connection state. Assume the goal of the primary machine is to relay TCP state to the secondary machine.

This can be accomplished by creating a message that contains the connections tuple and the connection state. The tuple information is sufficient for the secondary to consult the slow path processing path and create a matching connection record in the fast path connection table when the TCP state is conveyed as open.

Subsequent connection state information can be conveyed by sending a message with the tuple and TCP state information that has already been pre-determined by the primary machine. In this way, the secondary machine does not need to perform connection state calculations, thus reducing the amount of processing that would otherwise be required.

After creating the connection record aligned with the TCP Open State, the secondary machine would only be required to re-write the state in the identified record for each subsequent message/record received.

Messages are initiated, as opposed to sending connection related packets, when the primary machine receives any packet related to connection state (SYN, SYN-ACK, ACK, FIN, FIN-ACK, ACK) or in some cases receiving RESET or due to any other time-out or upper-level application signal. However, no message is required if the TCP state does not change and the secondary machine's only job is to update the connection state until it becomes the primary forwarding engine at some time in the future.

As the messages to the secondary machine have been reduced to the minimal content (tuple, state) required to create or find/update the connection record, it is also possible to send multiple connection records at the same time. A single message can therefore contain work for the secondary machine that spans multiple connection table creation/updates.

As more records are contained within the message, the state replication can become more efficient. For example, if 10 records are sent in one message, then the number of packets required to convey TCP state is reduced by 10.

The above-described techniques assume that only a SYN packet results in slow path processing and all other records within the message result in overwriting the TCP connection state until the connection state changes from "closed" to "listening". If the state for the connection indicates the transition from "close" to "listening", the secondary machine can remove the connection record from the fast path connection table.

Using messages as opposed to sending the full TCP packets can enable more efficient processes for both packets sent and volume of content. The described techniques assume that the implementation queues up the information for a few microseconds (1-5 microseconds, for example) before sending the information onwards or simply waiting until there are sufficient updates to relay to the secondary machine.

The connection tuple key is determined directly from the packet and the TCP state can be calculated in real time and hence can be combined easily to form the desired message.

In an embodiment, another mechanism is described for efficient TCP state replication from primary to secondary machine:

In an example, assume that any connection can also be identified by a connection ID that is guaranteed to be unique and can also be used as a key to create or locate a connection record. Additionally, assume that the connection ID is algorithmically related to the connections "tuple-based key" and related to how the lookup engine starts and progresses through all possible probes for connection records.

As the connection ID must be unique, the connection ID can be consulted for a record match, as opposed to the longer connection tuple identifier. As the goal is to relay TCP state from one device to the other, this can be accomplished by creating a message that contains the connections tuple, connection ID, and the connection state when relaying "open" state to the secondary device or machine.

Subsequent messages updating the state could alternatively send (connection ID, TCP state). This reduces the amount of information that is required for non-"open" record updates, especially when the tuple contains IPv6 based addressing.

In the simplest case, the connection ID could be the records location in the connection table, assuming both sides have the same table size with the same number of records. In this case, the message causes the secondary to over-write the associated records "TCP state" directly without any other processing requirements.

As the secondary machine's work is mostly limited to over-writing the current "TCP state", this operation, including finding the record, can be faster than performing fast path lookups (based on connection tuple) and hence can be performed at a higher rate than the maximum Packets Per Second (PPS) rate supported by the offload engine. Assuming that the job can be performed faster than the PPS rate, many devices can provide this connection record update in the order of 100s of millions/second.

The following describes a scenario for a response when failover packets are lost. The goal of the secondary machine is to maintain any connection that was previously open as a priority. This priority is leased to the vast majority of applications running without any noticeable impact.

It is possible that packets such as FIN or FIN-ACK or even RESET were lost during the transition. The connection does not cause an impact as long as the policy would have been allowed. The connection should, however, not be allowed to be maintained in the fast path connection table if the policy has recently changed in a manner that the connection would otherwise not been allowed.

To ensure that the connection will maintain the associated virtual machine (VM) isolation and security, the secondary machine can re-simulate all connections after taking over from the primary. The procedure for re-simulation is similar to receiving policy updates for the Elastic Network Interface (ENI) as described in U.S. patent application Ser. No. 17/855,730 filed Jun. 30, 2022, which is incorporated herein by reference.

Any connection from the fast path that no longer passes the slow path processing (re-simulation) can be removed. Additionally, if packets do arrive that appear to be out of sequence or invalid from the TCP state machine's point of view, one safe action that can be taken is to do nothing and let the connection age and thus be removed at a later time.

If packets arrive that are related to the normal closing of connections, then the secondary machine (now primary) should process the connection state normally. By favoring connections to remain open, the described implementation provide the end points with the ability to retransmit, close, or reset the connection gracefully via their TCP stack. Closing connections pre-maturely may cause the VM end points to be cut off from graceful shutdown and hence is not preferred.

When an active device or machine fails, the backup device or machine can become the new active device. The active and backup device or machine can communicate health states to determine when the backup becomes the active. In some embodiments, traffic can be forwarded to the correct device using Border Gateway Protocol (BGP). For example, the active and backup devices can have the same IP address, and BGP prepending can bed used to send traffic to the preferred device. If a backup device becomes active and a failed active device is taken offline, a new backup device can be added to provide redundancy. The new backup device may be synchronized using the techniques described herein, as well as using the techniques described in U.S. patent application Ser. No. 17/335,014 "HIGH AVAILABILITY FOR HARDWARE-BASED PACKET FLOW PROCESSING" filed on May 31, 2021, the contents of which are incorporated herein by reference.

Figure 7:
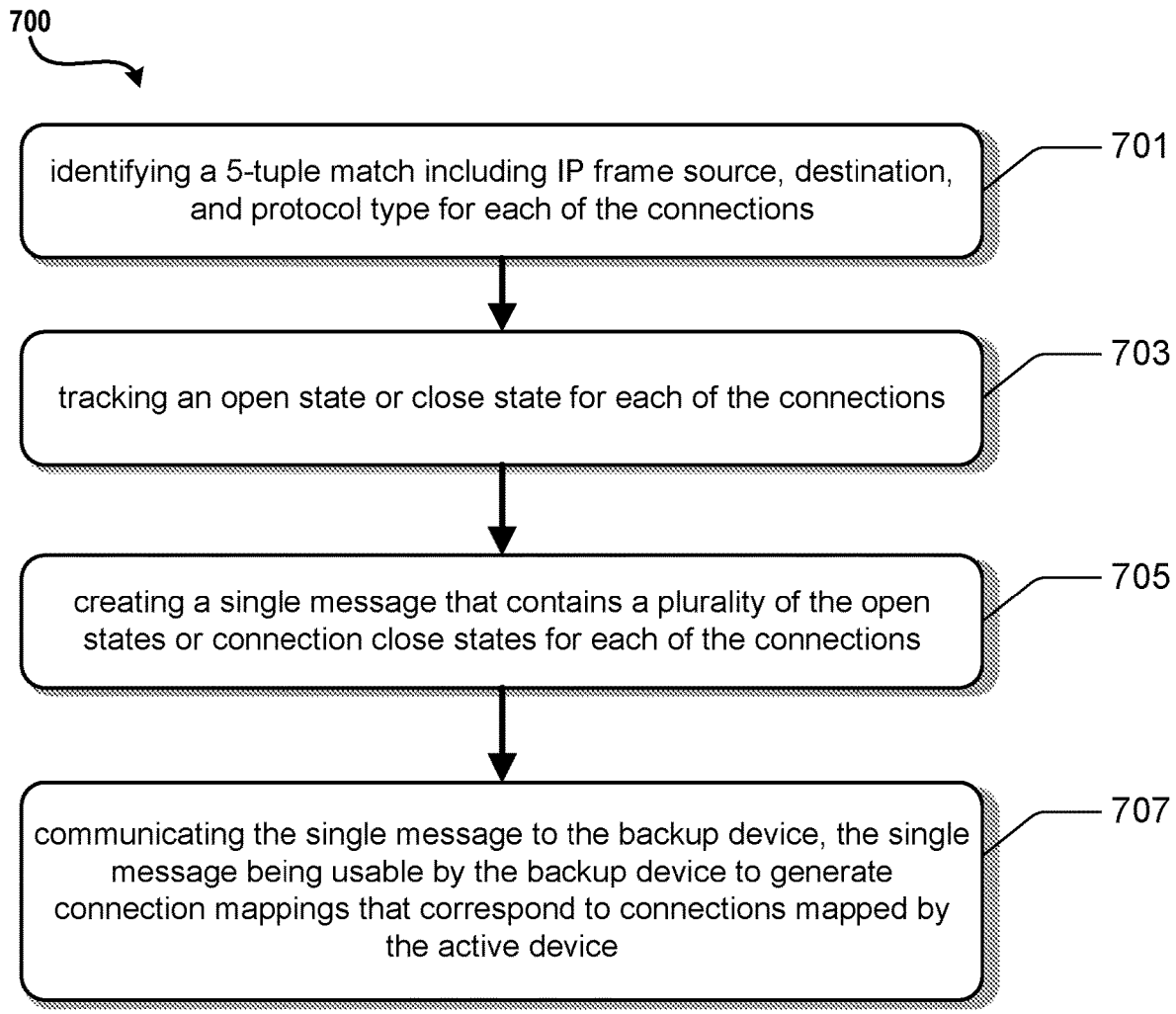
FIG. 7 is a flowchart depicting an example procedure in accordance with the present disclosure.

Turning now to FIG. 7, illustrated is an example operational procedure for replicating states of an active and backup device configured to track connections in a software defined network (SDN) of a virtual computing environment.

Such an operational procedure can be provided by one or more components illustrated in FIGS. 1 through 6. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 700 is described as running on a system, it can be appreciated that the routine 700 and other operations described herein can be executed on an individual computing device or several devices.

Referring to FIG. 7, operation 701 illustrates identifying a 5-tuple match including IP frame source, destination, and protocol type for each of the connections, the 5-tuple being a key to each connection.

Operation 701 may be followed by operation 703. Operation 703 illustrates tracking an open state or close state for each of the connections.

Operation 703 may be followed by operation 705. Operation 705 illustrates creating a single message that contains a plurality of the open states or connection close states for each of the connections.

Operation 705 may be followed by operation 707. Operation 707 illustrates communicating the single message to the backup device, the single message being usable by the backup device to generate connection mappings that correspond to connections mapped by the active device.

Figure 8:
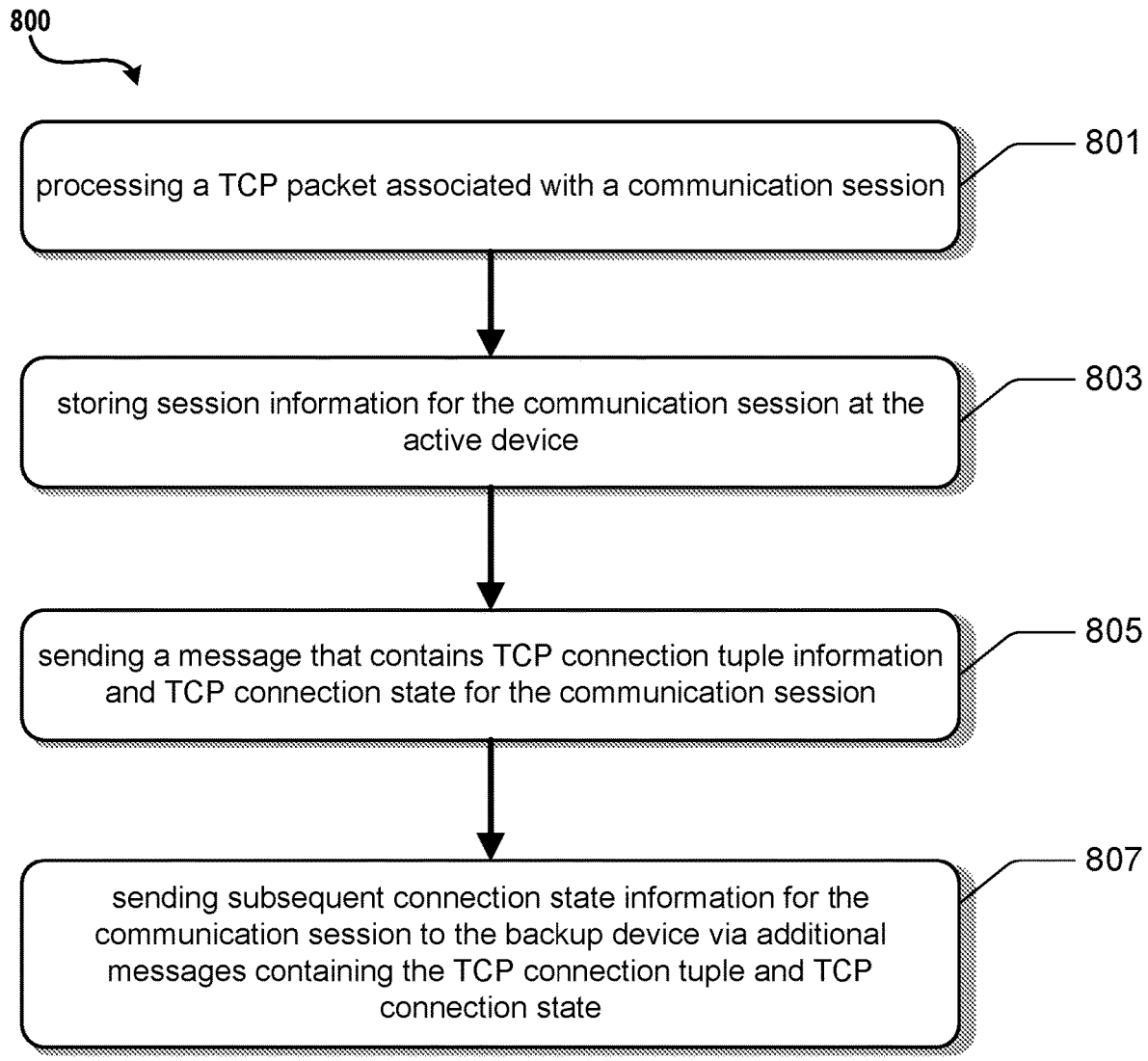
FIG. 8 is a flowchart depicting an example procedure in accordance with the present disclosure.

Turning now to FIG. 8, illustrated is another example operational procedure for replicating Transmission Control Protocol (TCP) states of an active device at a backup device. In an embodiment, the active device and backup device are configured to track connections in a software defined network (SDN). In an embodiment, the active device is configured to actively process connections, and the backup device maintains connection states such that the backup device can actively process connections in response to a failure of the active device.

Referring to FIG. 8, operation 801 illustrates processing, by the active device, a TCP packet associated with a communication session.

Operation 801 may be followed by operation 803. Operation 803 illustrates storing session information for the communication session at the active device.

Operation 803 may be followed by operation 805. Operation 805 illustrates sending, by the active device to the backup device, a message that contains TCP connection tuple information and TCP connection state for the communication session. In an embodiment, the connection tuple information is usable by the backup device to create a matching connection record in a connection table when the TCP connection state for the communication session is open.

Operation 805 may be followed by operation 807. Operation 807 illustrates sending subsequent connection state information for the communication session to the backup device via additional messages containing the TCP connection tuple and TCP connection state. This allows the backup device to maintain connection state information and avoid performing connection state processing for the communication session.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

Figure 9:
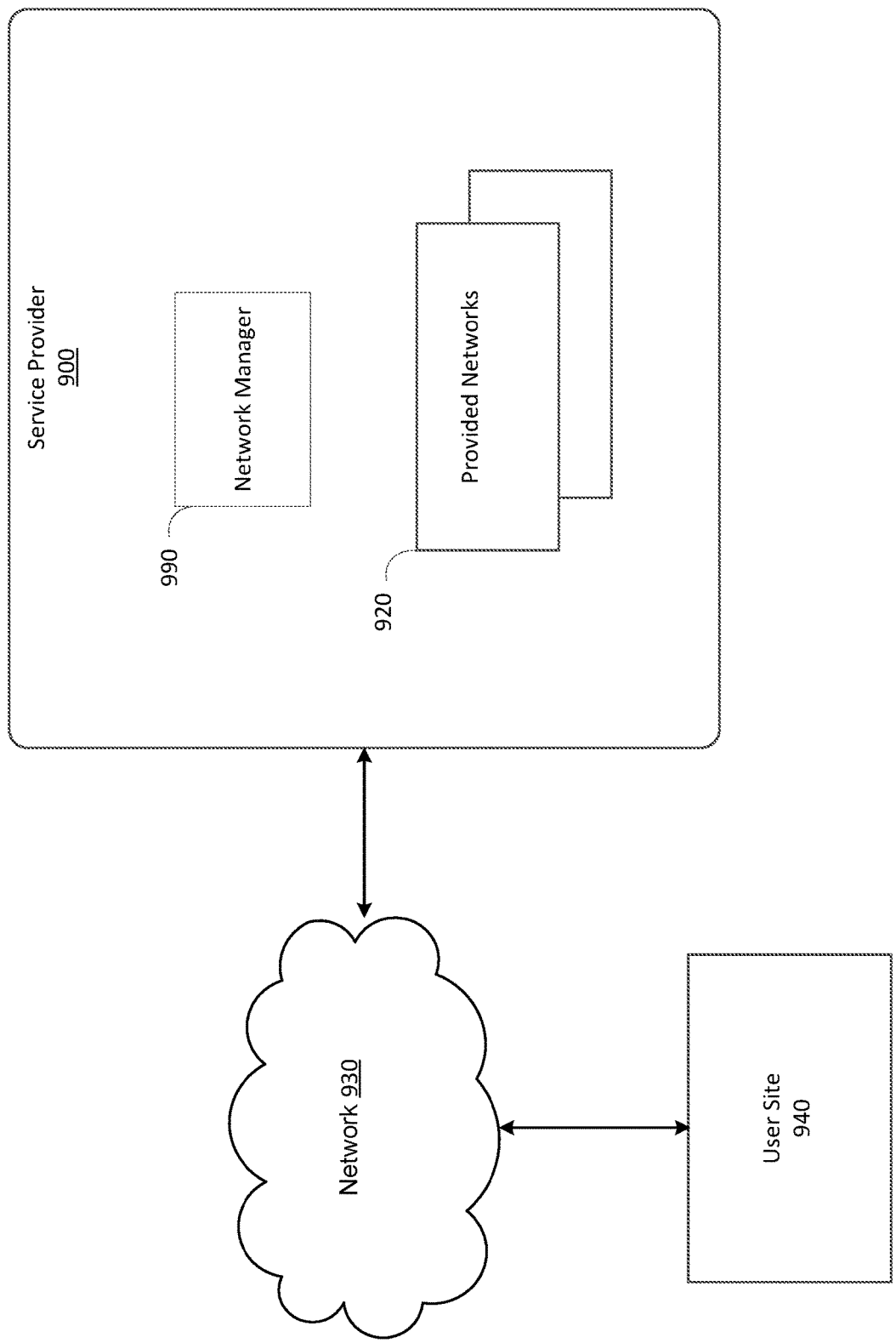
FIG. 9 is an example computing system in accordance with the present disclosure.

FIG. 9 illustrates an example computing environment in which the embodiments described herein may be implemented. FIG. 9 illustrates a service provider 900 that is configured to provide computing resources to users at user site 940. The user site 940 may have user computers that may access services provided by service provider 900 via a network 930. The computing resources provided by the service provider 900 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 900 may have various computing resources including servers, routers, and other devices that may provide remotely accessible computing and network resources using, for example, virtual machines. Other resources that may be provided include data storage resources. Service provider 900 may also execute functions that manage and control allocation of network resources, such as a network manager 990.

Network 930 may, for example, be a publicly accessible network of linked networks and may be operated by various entities, such as the Internet. In other embodiments, network 930 may be a private network, such as a dedicated network that is wholly or partially inaccessible to the public. Network 930 may provide access to computers and other devices at the user site 940.

Figure 10:
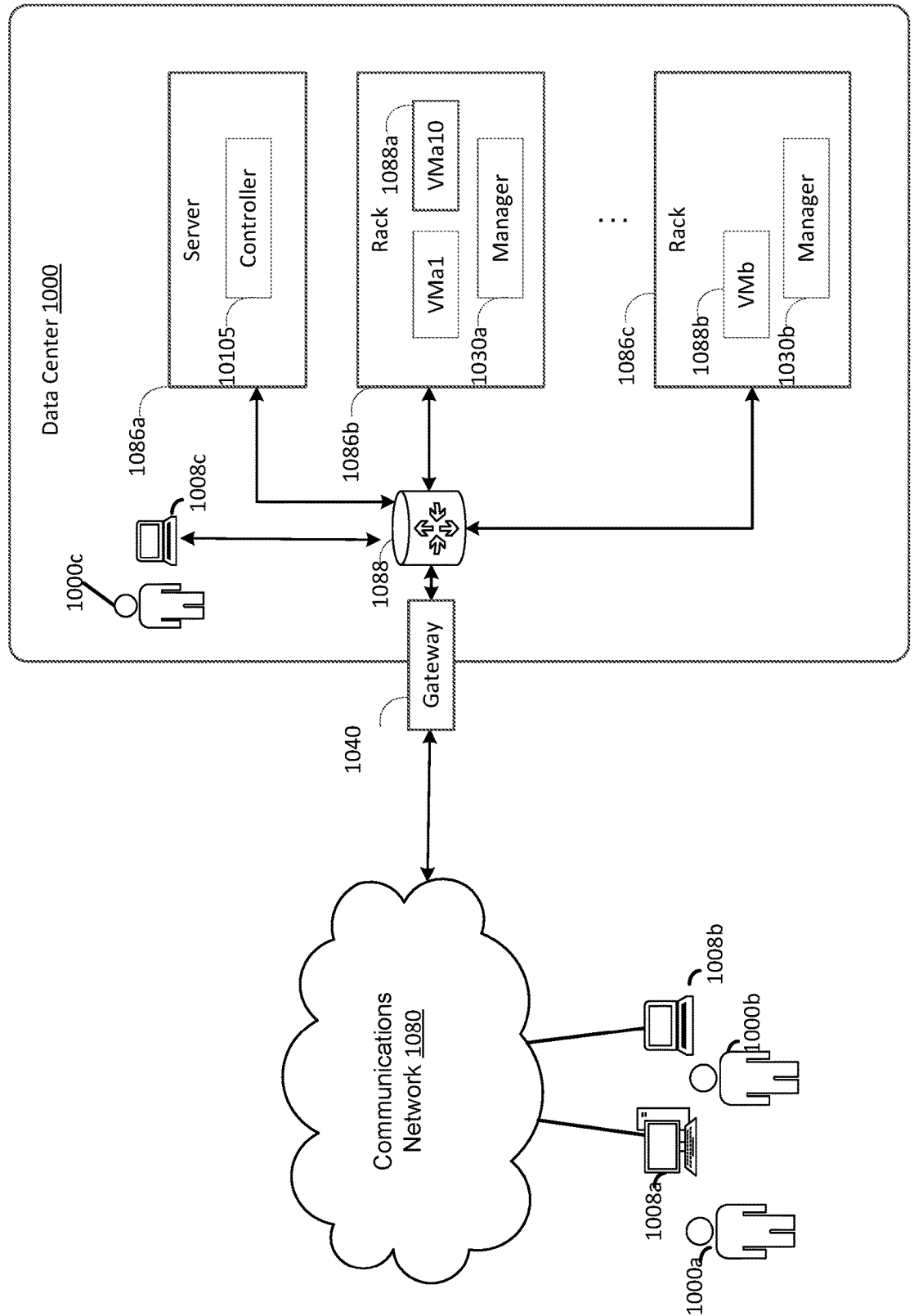
FIG. 10 is a diagram illustrating a data center in accordance with the present disclosure.

FIG. 10 illustrates an example computing environment in which the embodiments described herein may be implemented. FIG. 10 illustrates a data center 1000 that is configured to provide computing resources to users 1000a, 1000b, or 1000c (which may be referred herein singularly as "a user 1000" or in the plural as "the users 1000") via user computers 1008a, 1008b, and 1008c (which may be referred herein singularly as "a computer 1008" or in the plural as "the computers 1008") via a communications network 1080. The computing resources provided by the data center 1000 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 1000 may correspond to service provider 100 in FIGS. 1 and 10, or edge site 150 of FIG. 10. Data center 1000 may include servers 1086a, 1086b, and 1086c (which may be referred to herein singularly as "a server 1086" or in the plural as "the servers 1086") that may be standalone or installed in server racks, and provide computing resources available as virtual machines 1088a and 1088b (which may be referred to herein singularly as "a virtual machine 1088" or in the plural as "the virtual machines 1088"). The virtual machines 1088 may be configured to execute applications such as Web servers, application servers, media servers, database servers, and the like. Other resources that may be provided include data storage resources (not shown on FIG. 10) and may include file storage devices, block storage devices, and the like. Servers 1086 may also execute functions that manage and control allocation of resources in the data center, such as a controller 10105. Controller 10105 may be a fabric controller or another type of program configured to manage the allocation of virtual machines on servers 1086.

Referring to FIG. 10, communications network 1080 may, for example, be a publicly accessible network of linked networks and may be operated by various entities, such as the Internet. In other embodiments, communications network 1080 may be a private network, such as a corporate network that is wholly or partially inaccessible to the public.

Communications network 1080 may provide access to computers 1008. Computers 1008 may be computers utilized by users 1000. Computer 1008a, 1008b or 1008c may be a server, a desktop or laptop personal computer, a tablet computer, a smartphone, a set-top box, or any other computing device capable of accessing data center 1000. User computer 1008a or 1008b may connect directly to the Internet (e.g., via a cable modem). User computer 1008c may be internal to the data center 1000 and may connect directly to the resources in the data center 1000 via internal networks. Although only three user computers 1008a, 1008b, and 1008c are depicted, it should be appreciated that there may be multiple user computers.

Computers 1008 may also be utilized to configure aspects of the computing resources provided by data center 1000. For example, data center 1000 may provide a Web interface through which aspects of its operation may be configured through the use of a Web browser application program executing on user computer 1008. Alternatively, a standalone application program executing on user computer 1008 may be used to access an application programming interface (API) exposed by data center 1000 for performing the configuration operations.

Servers 1086 may be configured to provide the computing resources described above. One or more of the servers 1086 may be configured to execute a manager 1030*a* or 1030*b* (which may be referred herein singularly as "a manager 1030" or in the plural as "the managers 1030") configured to execute the virtual machines. The managers 1030 may be a virtual machine monitor (VMM), fabric controller, or another type of program configured to enable the execution of virtual machines 1088 on servers 1086, for example.

It should be appreciated that although the embodiments disclosed above are discussed in the context of virtual machines, other types of implementations can be utilized with the concepts and technologies disclosed herein.

In the example data center 1000 shown in FIG. 10, a network device 1088 may be utilized to interconnect the servers 1086*a* and 1086*b*. Network device 1088 may comprise one or more switches, routers, or other network devices. Network device 1088 may also be connected to gateway 1040, which is connected to communications network 1080. Network device 1088 may facilitate communications within networks in data center 1000, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 1000 described in FIG. 10 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 11:
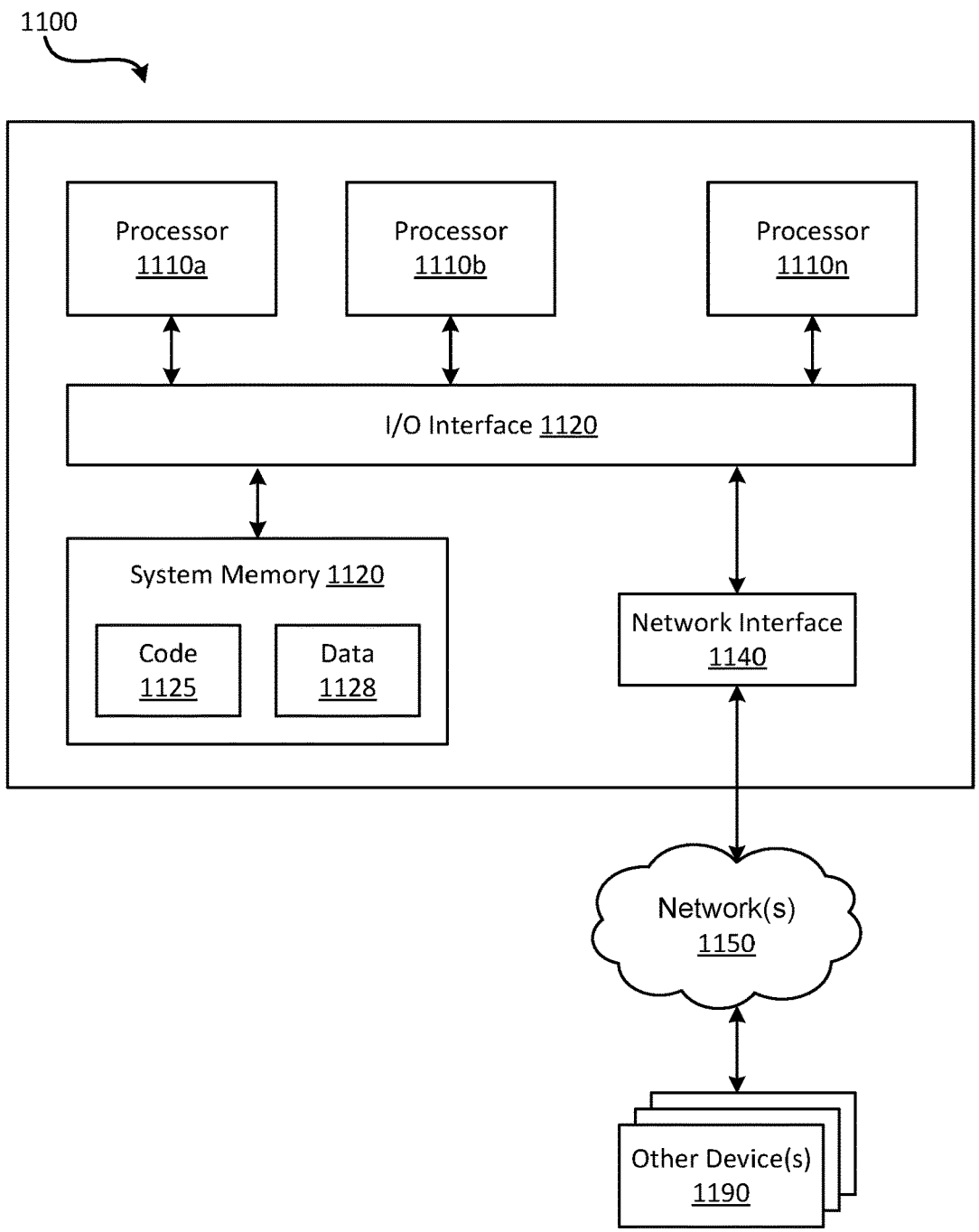
FIG. 11 is a diagram illustrating an example system in accordance with the present disclosure.

FIG. 11 illustrates a general-purpose computing device 1100. In the illustrated embodiment, computing device 1100 includes one or more processors 1110*a*, 1110*b*, and/or 1110*n* (which may be referred herein singularly as "a processor 1110" or in the plural as "the processors 1110") coupled to a system memory 1111 via an input/output (I/O) interface 1130. Computing device 1100 further includes a network interface 1140 coupled to I/O interface 1130.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x1111, PowerPC, SPARC, or MIPS ISAs, or any other suitable ISA. In multiprocessor systems, each of processors 1110 may commonly, but not necessarily, implement the same ISA.

System memory 1111 may be configured to store instructions and data accessible by processor(s) 1110. In various embodiments, system memory 1111 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1120 as code 1125 and data 1128.

In one embodiment, I/O interface 1130 may be configured to coordinate I/O traffic between the processor 1110, system memory 1111, and any peripheral devices in the device, including network interface 1140 or other peripheral interfaces. In some embodiments, I/O interface 1130 may perform any necessary protocol, timing, or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components. Also, in some embodiments some or all of the functionality of I/O interface 1130, such as an interface to system memory 1120, may be incorporated directly into processor 1110.

Network interface 1140 may be configured to allow data to be exchanged between computing device 1100 and other device or devices 1190 attached to a network or network(s) 1120, such as other computer systems or devices as illustrated in FIGS. 1 through 5, for example. In various embodiments, network interface 1140 may support communication via any suitable wired or wireless general data networks, such as types of Ethernet networks, for example. Additionally, network interface 1140 may support communication via telecommunications/telephony networks such as analog voice networks or digital fiber communications networks, via storage area networks such as Fibre Channel SANs or via any other suitable type of network and/or protocol.

In some embodiments, system memory 1120 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1100 via I/O interface 1130. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals such as electrical, electromagnetic or digital signals, conveyed via a communication medium such as a network and/or a wireless link, such as may be implemented via network interface 1140. Portions or all of multiple computing devices, such as those illustrated in FIG. 11, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 11, may include other components that are not explicitly shown in FIG. 11, or may utilize an architecture completely different than that shown in FIG. 11.

Figure 12:
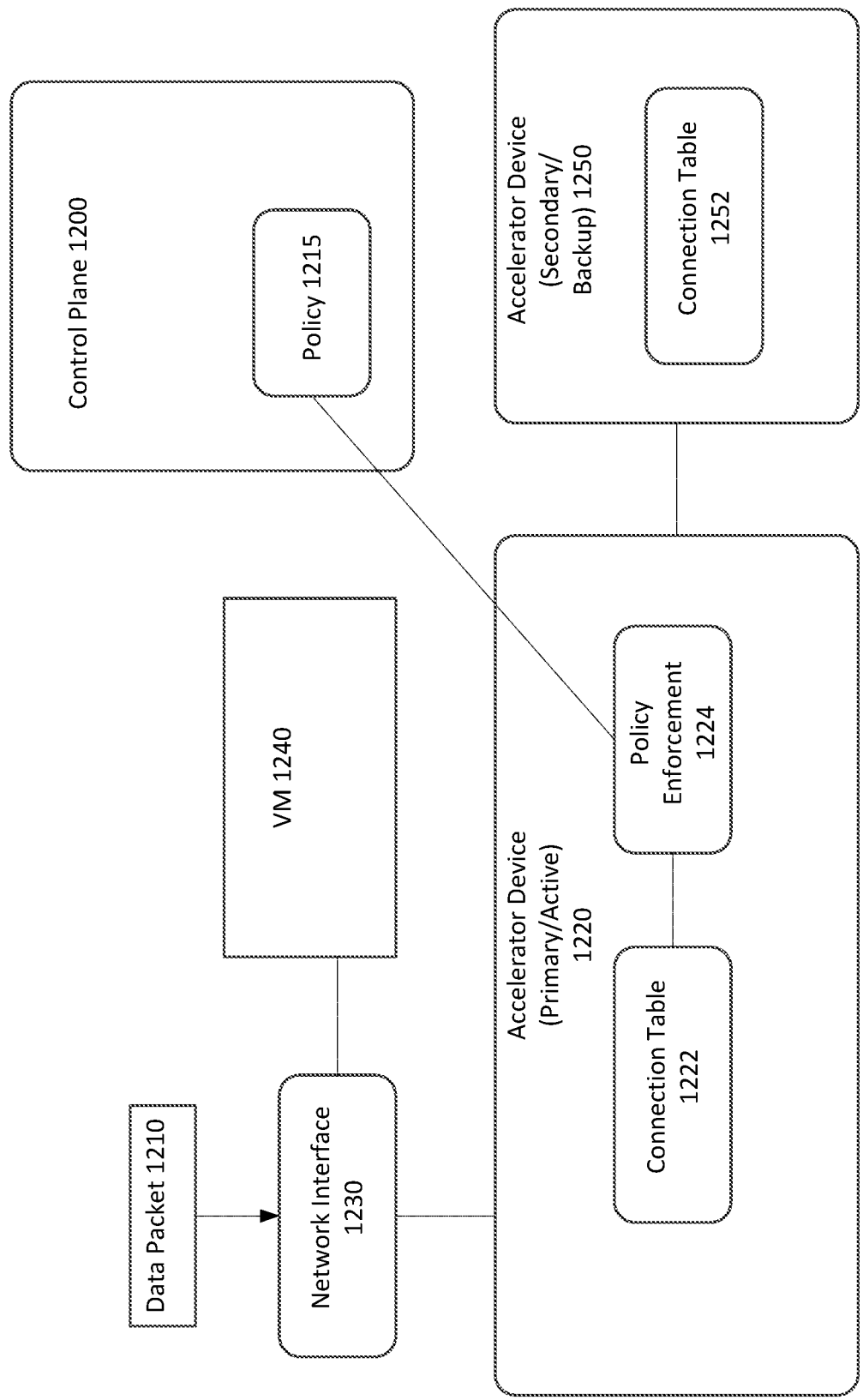
FIG. 12 is a diagram illustrating an example architecture in accordance with the present disclosure.

As used herein, an active device and backup device that are configured to track connections in a software defined network (SDN) may include network devices, appliances, and other devices that are implemented for processing packets in SDNs and other architectures that require processing of packets that are associated with various session and connections. For example, with reference to FIG. 12, illustrated is an example architecture illustrating packet processing with active and backup devices. In one example, a packet 1210 in a flow may be received via a network interface 1230. The packet 1210 may be identified and sent to a primary/active hardware-based accelerator device 1220 that is configured to perform processing of data flows in the fast path, as discussed herein. The fast path connections may be inserted into a connection table 1222. The primary/active hardware-based accelerator device 1220 may apply applicable policies 1224 for the data flow associated with the data packet 1210 and terminate application of the policies when the data flow is complete. Policy enforcement 1224 may be applied for SDN policies 1215 that are received, for example, from the SDN control plane 1200. A secondary/backup hardware-based accelerator device 1250 may be communicatively coupled to primary/active hardware-based accelerator device 1220 and synchronize its connection table 1252 with connection table 1222 of primary/active hardware-based accelerator device 1220 in accordance with the techniques described herein.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. An example procedure in accordance with the disclosed embodiments include:

A method for synchronizing states of an active device and a backup device configured to track connections in a software defined network (SDN) of a virtualized computing network, the method comprising:
    identifying, by the active device, a 5-tuple match including IP frame source, destination, and protocol type for a plurality of connections in the SDN, the 5-tuple being an identifier of the connection;
    tracking an open state or a connection closed state for the plurality of connections;
    creating a single message that contains a plurality of the open states or connection closed states for each of the plurality of connections; and
    communicating the single message to the backup device, the single message being usable by the backup device to generate connection mappings that correspond to connection mappings tracked by the active device.

The disclosure presented herein also encompasses the subject matter set forth in the following clauses:

Clause 1: A method for managing data flows in a virtualized computing environment by a hardware-based networking device configured to disaggregate processing of data packets of the data flows from hosts of the virtualized computing environment, the method comprising:
    in response to an indication of a policy update in the virtualized computing environment, accessing, by the hardware-based networking device, a connection table defining connection flows for data packets having a source from an endpoint in a virtual network of the virtualized computing environment or data packets having a destination to the endpoint in the virtual network of the virtualized computing environment;
    re-simulating, by the hardware-based networking device, full packet processing paths for each of the flows in the connection table; and based on the re-simulating, updating, by the hardware-based networking device, the flows in the connection table to ensure that the flows in the connection table implement the policy update.

Clause 2: The method of clause 1, further comprising the flows in the connection table to ensure that the flows in the connection table implement other policies that were updated after flows affected by the other policies that were updated.

Clause 3: The method of any of clauses 1-2, further comprising continuously re-simulating and updating the full packet processing paths for the flows in the connection table according to a predetermined update schedule.

Clause 4: The method of any of clauses 1-3, further comprising using connection keys to access individual flows in the connection table.

Clause 5: The method of any of clauses 1-4, further comprising adding a connection identifier in the connection table as connections are created.

Clause 6: The method of any of clauses 1-5, wherein the re-simulating comprises:
determining if the connection identifier is present in the connection table; and
performing the re-simulating in response to determining that the connection identifier is not present.

Clause 7: The method of clauses 1-6, wherein the connection keys comprise a tuple for a corresponding connection.

Clause 8: The method of any of clauses 1-7, wherein the tuple comprises Destination IP, Source IP, Destination Port, Source Port, Protocol ID or a compressed ID representing the Destination IP, Source IP, Destination Port, Source Port, Protocol ID.

Clause 9: The method of any of clauses 1-8, wherein the re-simulating comprises comparing a stored hash to an action to determine a match.

Clause 10: The method of any of clauses 1-9, wherein the policy update comprises one or more of an update to a forwarding table, rules table, or mappings table.

Clause 11: A hardware-based networking device configured to disaggregate processing of data packets from hosts of a virtualized computing environment, the hardware-based networking device comprising a hardware-based component implementing packet processing graphs for data flows in the virtualized computing environment, the hardware-based networking device configured to perform operations comprising:
in response to an indication of a policy update in the virtualized computing environment, accessing a connection table defining connection flows for data packets having a source from an endpoint in a virtual network of the virtualized computing environment or data packets having a destination to the endpoint in the virtual network of the virtualized computing environment;
re-simulating full packet processing paths for each of the flows in the connection table; and
based on the re-simulating, updating, the flows in the connection table to ensure that the flows in the connection table implement the policy update.

Clause 12: The hardware-based networking device of clause 11, further configured to perform operations comprising:
adding a connection identifier in the connection table as connections are created.

Clause 13: The hardware-based networking device of any of clauses 11 and 12, wherein the re-simulating comprises:
determining if the connection identifier is present in the connection table; and
performing the re-simulating in response to determining that the connection identifier is not present.

Clause 14: The hardware-based networking device of any clauses 11-13, further configured to perform operations comprising using connection keys to access individual flows in the connection table, wherein the connection keys comprise a tuple for a corresponding connection.

Clause 15: The hardware-based networking device of any clauses 11-14, wherein the re-simulating comprises comparing a stored hash to action to determine a match.

Clause 16: The hardware-based networking device of any clauses 11-15, further configured to perform operations comprising continuously re-simulating and updating the full packet processing paths for the flows in the connection table according to a predetermined update schedule.

Clause 17: A computing system comprising a plurality of computing devices and one or more hardware-based networking devices configured to disaggregate processing of data packets from the plurality of computing devices, the hardware-based networking device comprising a hardware-based component implementing a plurality of packet processing graphs for data flows in the computing system, the hardware-based networking device configured to perform operations comprising:
in response to an indication of a policy update in the computing system, obtaining a connection table defining flows for packets having a source from or destination to an endpoint in a virtual network of the virtualized computing environment;
using connection keys to access the flows in the connection table;
re-simulating, by the hardware-based networking device, full packet processing paths for each of the flows in the connection table; and
updating, by the hardware-based networking device, the flows to ensure that the flows in the connection table reflect policies that were updated after corresponding flows were added to the connection table.

Clause 18: The computing system of clause 17, the hardware-based networking device further configured to perform operations comprising:
adding a connection identifier in the connection table as connections are created.

Clause 19: The computing system of any of clauses 17 and 18, wherein the re-simulating comprises:
determining if the connection identifier is present in the connection table; and
performing the re-simulating in response to determining that the connection identifier is not present.

Clause 20: The computing system of any of the clauses 17-19, wherein the connection keys comprise a tuple for a corresponding connection.

What is claimed is:

1. A method for replicating Transmission Control Protocol (TCP) states of an active device at a backup device, the active device and backup device configured to track connections in a software defined network (SDN), wherein the active device is configured to actively process connections, and the backup device maintains connection states such that the backup device can actively process connections in response to a failure of the active device, the method comprising:
processing, by the active device, a TCP packet associated with a communication session;
storing session information for the communication session at the active device, wherein the session information comprises information for a fast path connection based on full packet processing of the communication session that can be offloaded to an acceleration device, the full packet processing comprising application of a set of rules for the TCP packet;

sending, by the active device to the backup device, a message that contains TCP connection tuple information and TCP connection state for the communication session, wherein the connection tuple information is usable by the backup device to create a matching connection record in a connection table when the TCP connection state for the communication session is open, wherein connections represented by connection records in the connection table comprise fast path connections based on full packet processing of corresponding connections; and sending subsequent connection state information for the communication session to the backup device via additional messages containing the TCP connection tuple and TCP connection state, thereby allowing the backup device to maintain connection state information and avoid performing connection state processing for the communication session.

2. The method of claim 1, further comprising switching from the active device to the backup device in response to a failure of the active device.

3. The method of claim 2, further comprising synchronizing states between the backup device and an additional backup device.

4. The method of claim 1, further comprising removing a connection record from the connection table in response to receiving an FIN, FIN-ACK, and ACK sequence.

5. The method of claim 1, wherein the connection record is located in the connection table using a TCP tuple key comprising SRC IP, DST IP, SRC Port, DST Port, and Port ID.

6. The method of claim 1, wherein the connection record includes a TCP tuple key, a currently derived TCP state, and forwarding and transformation information for fast path processing.

7. The method of claim 1, wherein after the backup device has updated a connection record with a TCP Open State, the backup device rewrites the state in an identified connection record for each subsequent message that is received.

8. The method of claim 1, further comprising initiating a message in lieu of sending a connection related packet, when the primary device sends to the backup device any packet related to a connection state, receiving a RESET, a time-out, or an upper-level application signal.

9. The method of claim 8, further comprising sending multiple connection records in a single message spanning multiple connection table updates.

10. The method of claim 9, wherein the connection record is identifiable by a unique connection ID.

11. The method of claim 10, wherein the unique connection ID is algorithmically related to a respective TCP tuple.

12. The method of claim 10, wherein the additional messages include a connections tuple, unique connection ID, and the connection state.

13. The method of claim 10, wherein subsequent messages updating the connection record includes the connection ID and TCP state.

14. A networking device configured to disaggregate processing of data packets from hosts of a virtualized computing environment, wherein the networking device is a backup networking device, the networking device configured to perform operations comprising:

receiving, from an active networking device, a message comprising TCP connection tuple information and TCP connection state for a communication session;

using the connection tuple information to access and retrieve session information, wherein the session information comprises information for a fast path connection based on full packet processing of the communication session that can be offloaded to an acceleration device, the full packet processing comprising application of a set of rules for TCP packets of the communication session;

creating a matching connection record in a connection table when a TCP state for the communication session is open, wherein connections represented by connection records in the connection table comprise fast path connections based on full packet processing of corresponding connections; and receiving subsequent connection state information for the communication session from the active device via an additional message having the TCP connection tuple and TCP connection state, thereby allowing the backup device to avoid performing connection state processing.

15. A computing system comprising an active device and a backup device configured to disaggregate processing of data packets in a SDN, the computing system configured to perform operations comprising:

receiving, by the backup device from the active device, a message comprising TCP connection tuple information and TCP connection state for a communication session;

using, by the backup device, the connection tuple information to access and retrieve session information, wherein the session information comprises information for a fast path connection based on full packet processing of the communication session that can be offloaded to an acceleration device, the full packet processing comprising application of a set of rules for TCP packets of the communication session;

creating, by the backup device, a matching connection record in a connection table at the backup device when a TCP state for the communication session is open, wherein connections represented by connection records in the connection table comprise fast path connections based on full packet processing of corresponding connections; and sending, by the active device to the backup device, subsequent connection state information for the communication session via an additional message having the TCP connection tuple and TCP connection state, thereby allowing the backup device to avoid performing connection state processing.

\* \* \* \* \*